(No Model.)
E. L. THOMAS & B. B. FORBES.
BICYCLE LOCK.
No. 563,991. Patented July 14, 1896.
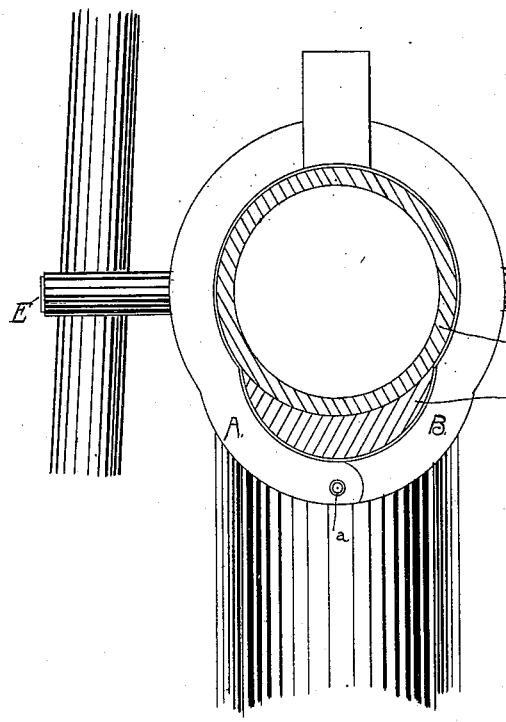
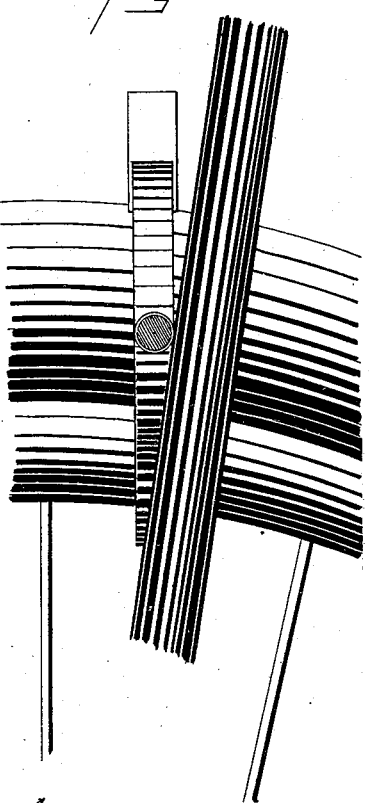
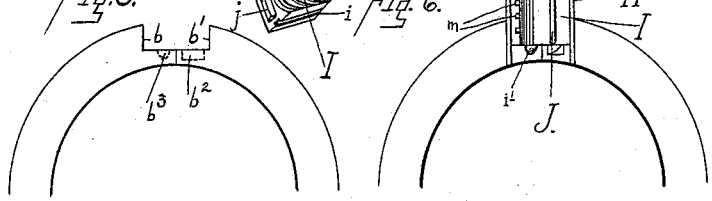
Witnesses:
Frederick F. Goodwin
T. S. Warbridge
Inventors:
E. L. Thomas
B. B. Forbes
By his Attorneys
Offield, Towle & Linthicum

UNITED STATES PATENT OFFICE.

ELMER L. THOMAS AND BURT B. FORBES, OF CHICAGO, ILLINOIS; SAID FORBES ASSIGNOR TO SAID THOMAS.

BICYCLE-LOCK.

SPECIFICATION forming part of Letters Patent No. 563,991, dated July 14, 1896.

Application filed December 3, 1895. Serial No. 570,905. (No model.)

*To all whom it may concern:*

Be it known that we, ELMER L. THOMAS and BURT B. FORBES, of Chicago, Illinois, have invented certain new and useful Improvements in Bicycle-Locks, of which the following is a specification.

This invention relates to a bicycle-lock which is adapted to encircle the tire and rim and provided with arms to strike upon the fork members to prevent more than a partial rotation of the wheel.

The invention may be applied to either wheel of a bicycle, and can be readily attached and removed.

In the accompanying drawings, Figure 1 shows the wheel-rim and tire in section with a lock embracing the same, the fork members in elevation broken away, the locking-arms engaging such fork members. Fig. 2 is a side elevation of the parts shown in Fig. 1. Figs. 3 and 4 are broken elevations, respectively, of a lock-rim and lock. Fig. 5 is a perspective view of a guard-plate, and Fig. 6 a similar view of a lock-bolt.

The body of the lock is composed of two members A B, which are hinged together, as at $a$, and curved in their general contour, so as to adapt them to embrace the rim C and tire D of the wheel. The members A B are provided with offstanding arms or lugs E, which may be formed integrally with the parts A B, and are preferably covered with a sheathing F of rubber to prevent scratching the fork members G, against which said members are adapted to impinge when the wheel is rotated. The ends of the members A B, opposite their pivot, are notched, as shown at $b$ $b'$, and over such mating notched ends is fitted a lock-case H, which contains a sliding locking-bolt I. (Shown in detail in Fig. 6.) Said locking-bolt is concave upon its inner face, and its sides are scored, as shown at $i$, to receive guides J, one of which is shown in Fig. 4. On its lower end the bolt I carries a locking-lug $j$, which is adapted to engage in the recess $b^3$ of the member B, said locking-bolt being normally depressed into the locking position by the spring K.

L represents the key-post, which is cylindrical in form, and has a key-slot $l$, to which is adapted the shank of a key M. Said key has one or more bits $m$, which are adapted to engage in the steep-pitched grooves $n$ of the locking-bolt I, and a pintle $i'$, which engages in the recess $b^3$.

In applying the lock to the bicycle the members A and B are separated, so as to pass over the rim and tire, and the bolt will snap into place. In this position the arms E will, when the wheel is rotated, come in contact with the fork members G, and thus prevent the unauthorized use of the bicycle. When the key is inserted and turned so that the bits engage with the grooves of the locking-bolt, the latter will be raised, freeing the locking-lug from the notch $b^2$, and permitting the parts of the lock to be separated.

The lock is very simple in construction, and the whole device may be conveniently carried in the pocket. It is applicable to either wheel, and may be tightly clamped around the rim and tire, and, as it is adapted to engage with the fork members, the wheel is not so likely to be injured as in that class of locks where the locking-arms contact with the spokes.

We claim—

1. A bicycle-lock, consisting of a body portion having two members hinged together at one end and having their bodies curved to embrace the wheel-rim and tire, a lock applied to the opposite end of said members and adapted to detachably connect them, locking-arms projecting from the sides of said hinged members and adapted to contact with the fork members of the frame, substantially as described.

2. A locking mechanism for a bicycle, comprising in combination curved body members pivotally connected together, a locking mechanism applied to their opposite ends, stop-arms rigidly connected to and projecting from their sides, and said stop-arms having a non-abrasive covering, substantially as described.

3. A bicycle-lock, comprising in combination with two body members pivotally connected together, curved to embrace the rim and tire and having lateral stop-arms and a locking mechanism carried by one of said body members and consisting of a lock-case, a sliding bolt having a locking-lug on its lower end, a concave depression in its face, grooves in said face, a slotted key-post and a key adapted to said slot and having bits to engage in said grooves and a spring to normally depress said bolt into locking position, substantially as described.

ELMER L. THOMAS.
BURT B. FORBES.

Witnesses:
CHARLES H. COTTON,
EDWARD A. RENWICK.